US008089669B2

(12) United States Patent
Sakakibara et al.

(10) Patent No.: US 8,089,669 B2
(45) Date of Patent: Jan. 3, 2012

(54) APPARATUS AND CONTROL METHOD FOR IMAGE READING, IMAGE FORMING APPARATUS

(75) Inventors: Jun Sakakibara, Tokyo (JP); Koji Tanimoto, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1010 days.

(21) Appl. No.: 11/874,442

(22) Filed: Oct. 18, 2007

(65) Prior Publication Data

US 2009/0103149 A1    Apr. 23, 2009

(51) Int. Cl.
*H04N 1/46* (2006.01)
(52) U.S. Cl. ........ 358/514; 358/505; 358/512; 358/513; 358/530; 358/538
(58) Field of Classification Search .......... 358/512–514, 358/505, 515, 538, 530; 382/294, 167, 165; 250/208.1, 216
See application file for complete search history.

(56) References Cited

U.S. PATENT DOCUMENTS

| 6,496,286 | B1* | 12/2002 | Yamazaki | 358/514 |
|---|---|---|---|---|
| 7,054,040 | B2* | 5/2006 | Shoda et al. | 358/474 |
| 7,274,496 | B2* | 9/2007 | Sakakibara et al. | 358/514 |
| 7,345,795 | B2* | 3/2008 | Ando | 358/474 |
| 7,403,308 | B2* | 7/2008 | Moro | 358/2.1 |
| 7,471,426 | B2* | 12/2008 | Ide et al. | 358/474 |
| 7,489,426 | B2* | 2/2009 | Hashizume | 358/514 |
| 7,648,071 | B2* | 1/2010 | Tsutsumi | 235/454 |
| 2004/0012815 | A1* | 1/2004 | Fuchigami | 358/2.1 |
| 2007/0070444 | A1* | 3/2007 | Sakakibara et al. | 358/474 |
| 2008/0187243 | A1* | 8/2008 | Misaka | 382/294 |
| 2008/0187244 | A1* | 8/2008 | Shoda | 382/294 |
| 2009/0086294 | A1* | 4/2009 | Sakakibara | 358/514 |
| 2009/0091807 | A1* | 4/2009 | Kagami et al. | 358/486 |
| 2009/0097078 | A1* | 4/2009 | Ide et al. | 358/474 |
| 2009/0103146 | A1* | 4/2009 | Hashizume | 358/474 |

FOREIGN PATENT DOCUMENTS

| JP | 06-311302 | 11/1994 |
|---|---|---|
| JP | 10-042150 | 2/1998 |
| JP | 10-336470 | 12/1998 |
| JP | 10336470 A * | 12/1998 |
| JP | 2001-016434 | 1/2001 |
| JP | 2002-111968 | 4/2002 |

(Continued)

OTHER PUBLICATIONS

Japanese Office Action for Japanese Patent Application No. 2008-202002 mailed on Sep. 13, 2011.

*Primary Examiner* — Cheukfan Lee
(74) *Attorney, Agent, or Firm* — Turocy & Watson, LLP

(57) ABSTRACT

It is made possible to determine image characteristics in a reading image while the image of an original is being read. A first line sensor (9R2, 9G2, 9B2) is arranged on a board and reads the original image. A second line sensor (9K1) has a larger number of pixels than the first line sensor and is arranged on the board to read the original image earlier than the first line sensor. An image signal processing characteristic control unit (46) uses an output of the second line sensor as a control signal to control the processing characteristic of the image signal read by the first line sensor.

13 Claims, 13 Drawing Sheets

FOREIGN PATENT DOCUMENTS

| | | |
|---|---|---|
| JP | 2002-271631 | 9/2002 |
| JP | 2003-274115 | 9/2003 |
| JP | 2004-056752 | 2/2004 |
| JP | 2004-180196 | 6/2004 |
| JP | 2004-272840 | 9/2004 |
| JP | 2004-289289 | 10/2004 |
| JP | 2008-147783 | 6/2008 |

* cited by examiner

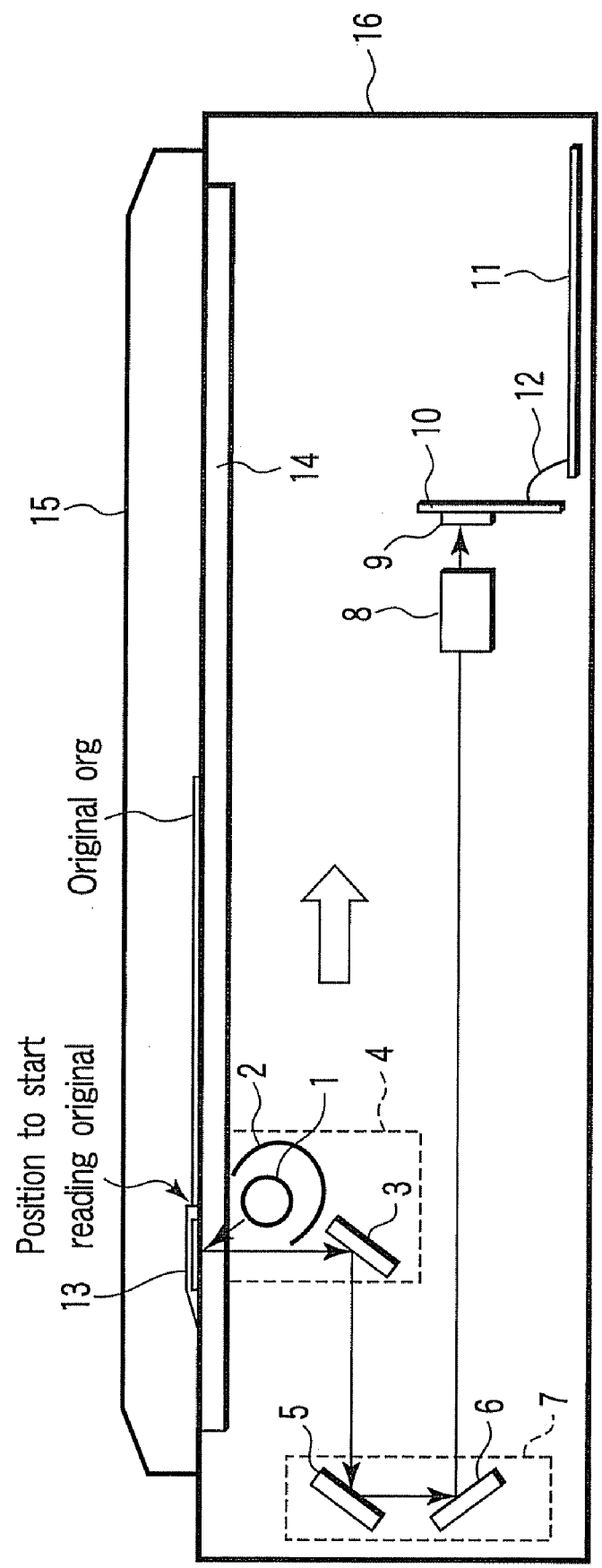
F I G. 1

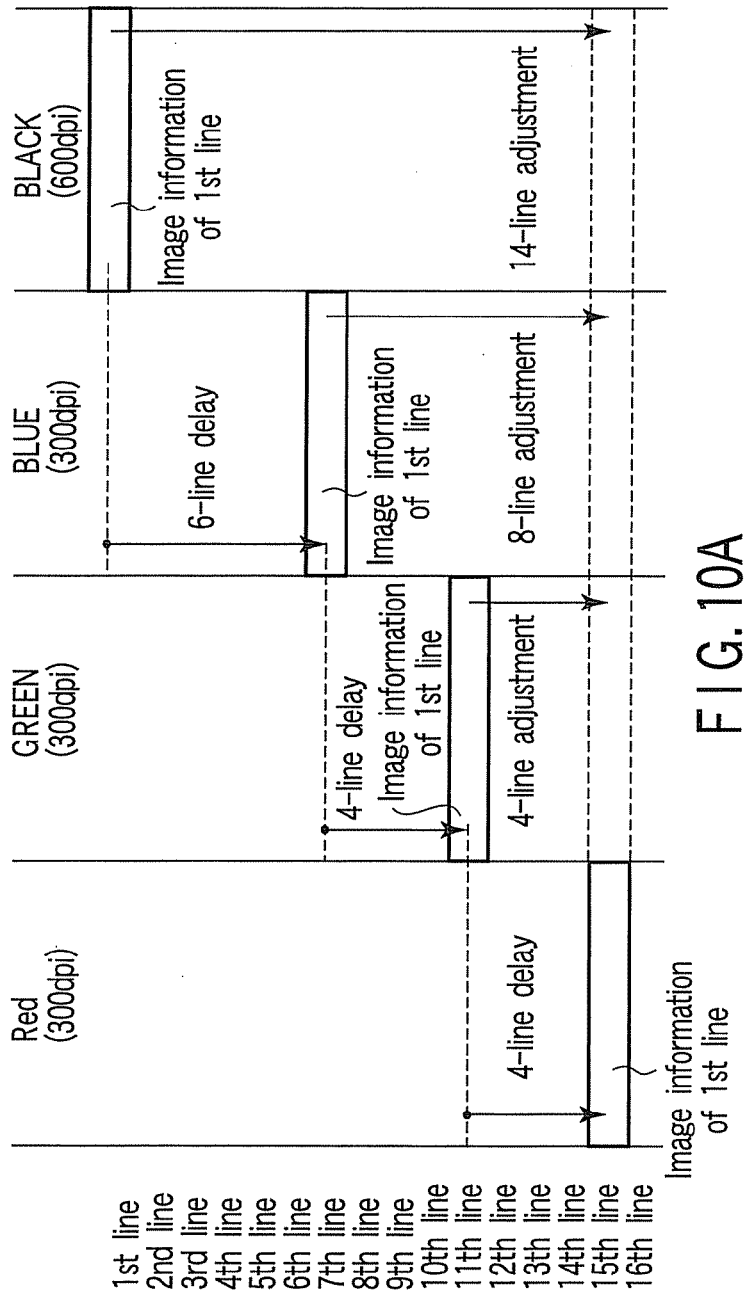

APPARATUS AND CONTROL METHOD FOR IMAGE READING, IMAGE FORMING APPARATUS

BACKGROUND OF THE INVENTION

1. Field of the Invention

An embodiment of the present invention relates to an apparatus and control method for image reading, and an image forming apparatus. This apparatus can suitably be applied to an image reading apparatus that optically reads an original with a scanner, and also can suitably be applied to a digital copy machine or the like that forms an image based on image data that has been read.

2. Description of the Related Art

Traditionally, a three-line CCD sensor including three lines of red, green, and blue has been employed for reading a color image. In the three-line CCD sensor, red, green, and blue color filters are arranged on the light receiving surfaces of the three line sensors. It has a configuration in which the three line sensors are arrayed in parallel.

In the three-line CCD sensor, all the line sensors cannot simultaneously read the same part of the original. Therefore, a position shift between the lines in the original scanning direction is compensated for by a memory circuit that includes a line memory or the like. That is, time alignment of image signals read by the respective line sensors is carried out by using the memory circuit.

Also, a four-line CCD sensor has recently been produced as a commercial product. The four-line CCD sensor has a line sensor for monochrome reading to read a monochrome image in addition to the three-line CCD sensor. This line sensor for monochrome reading has no color filter arranged on its light receiving surface. References disclosing techniques related to CCD sensors are JP-A-2004-272840, JP-A-2004-180196, and JP-A-2003-274115 (Japanese Patent Application Publications (KOKAI)).

As for this four-line CCD sensor, it has been proposed that the light receiving area of the pixel is varied between the light sensor for monochrome reading and the three line sensors for color reading so that a monochrome original is read with high resolution while a color original is read with high sensitivity.

Meanwhile, in the traditional image reading apparatus, it is necessary to read an entire original, store its image data in a memory section such as a page memory, and determine a character area and a photograph area from the overall image. This is because proper features must be set in accordance with the character area and the photograph area when performing image processing.

In the case of reading an entire original and temporarily saving its image data into a page memory, a large-capacity page memory is required and it also takes time. For example, in the case where an A4-size sheet of an original is read with a resolution of 600 dpi, a capacity of about 35 Mbytes for monochrome, or a capacity of 105 Mbytes for color, which is three times more than the monochrome case, is necessary. Moreover, a work area is necessary in order to determine whether an image is of characters or a photograph on the basis of that area.

In this manner, a large-capacity memory is necessary to read a sheet of an original and store its image data. Therefore, images of plural originals must be stored as in N-to-1 to print images of plural originals on one sheet, for example, in 4-to-1 (N-to-1) in the case of printing four images on one sheet. A memory with a larger capacity is required.

BRIEF SUMMARY OF THE INVENTION

An object of one embodiment of the invention is to provide an apparatus and control method for image reading, and an image forming apparatus that enables determination of image features of a read image while the image of an original is being read.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

According to the one embodiment mentioned above, an apparatus has a first line sensor which is arranged on a board and reads an original image, a second line sensor which has a larger number of pixels than the first line sensor and is arranged on the board to read the original image before the first line sensor, and a processing characteristic control unit configured to use an output of the second line sensor as a control signal to control a processing characteristic of an image signal read by the first line sensor.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing a schematic configuration of an image reading apparatus which uses a CCD line sensor.

FIG. 10A, FIG. 10B, and FIG. 10C are explanatory views showing the capacity of a line memory that is necessary to make time adjustment between lines, of information read in advance by a monochrome line sensor.

DETAILED DESCRIPTION OF THE INVENTION

Figure 2:
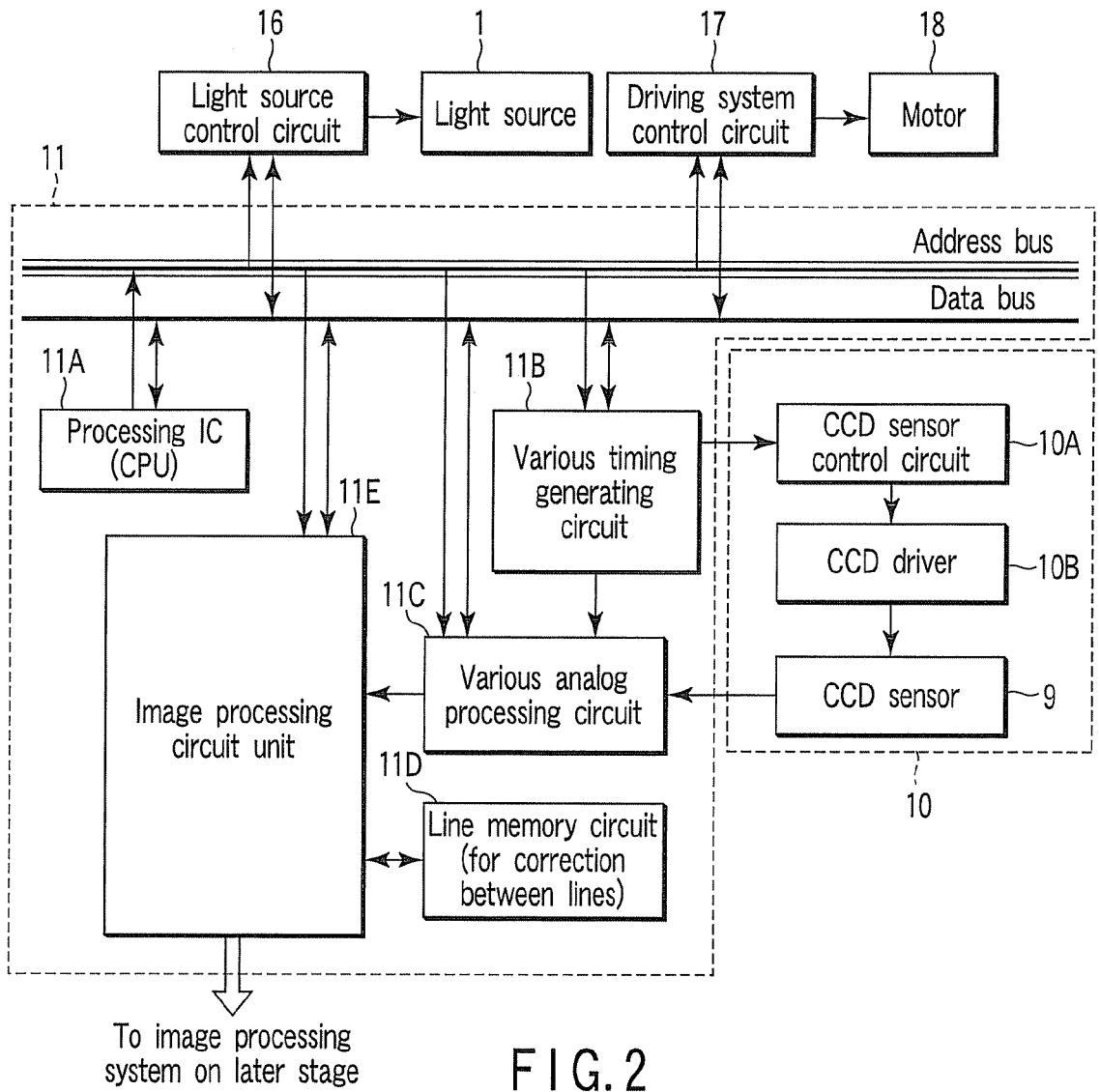
FIG. 2 is a view showing a schematic configuration of a control system of the image reading apparatus.

Hereinafter, an embodiment of the invention will be described with reference to the drawings. FIG. 1 shows a schematic configuration of an image input apparatus which uses a CCD line sensor.

The image input apparatus, which is a scanner, has a first carriage 4, a second carriage 7, a condensing lens 8, a CCD sensor board 10, a control board 11, a white reference board 13, an original glass 14, an original holding cover 15, and a scanner casing 16.

The first carriage 4 has a light source 1, a reflector 2 which corrects luminous intensity distribution of the light source 1, and a first mirror 3. The second carriage 7 has a second mirror 5 and a third mirror 6. The CCD sensor board 10 has a CCD line sensor 9 mounted thereon. On the control board 11, a circuit to control the four-line CCD sensor 9 and to carry out various processings is mounted. The white reference board 13 is used as a reference of white color. An original org is set on the original glass 14. The original holding cover 15 holds the original org so that it does not float.

The features of this apparatus are the four-line CCD sensor 9 and the control board 11. First, a schematic operation of the scanner will be described with reference to FIG. 1.

Light cast from the light source 1 is transmitted through the original glass 14 and cast onto the original org. The light intensity distribution of the light cast from the light source 1 is not uniform and uneven light intensity distribution occurs in illuminance on the original org. Therefore, also the reflected light from the reflector 2 is cast onto the original org, thus realizing uniform light intensity distribution on the original org.

The reflected light from the original org is reflected by the first mirror 3, the second mirror 5 and the third mirror 6, is then transmitted through the condensing lens 8, and forms an image on the light receiving surface of the CCD line sensor 9. The four-line CCD line sensor 9 is mounted on the CCD sensor board 10 and is controlled by a control signal inputted from the control board 11. The control board 11 and the CCD sensor board 10 are connected with each other by a harness 12. The details of the control board 11 will be described later with reference to FIG. 2.

The original holding cover 15 is to press and hold the original org set on the original glass 14 so that the reading side of the original org tightly contacts the original glass 14.

The detailed configuration of the four-line CCD line sensor 9 will be described with reference to FIG. 3 and the subsequent drawings. An analog signal outputted from the four-line CCD sensor 9 includes a high-frequency distortion due to difference in conversion efficiency among photoelectric conversion units and a low-frequency distortion due to aberration caused by the fact that it is a reducing optical system using the condensing lens 8. Therefore, data which can serve as a reference for carrying out normalization correction of the analog signal is necessary. In FIG. 1, the reference data is image data at the time of reading the white reference board 13.

The configuration of the control board 11 will now be described with reference to FIG. 2. The control board 11 has a processing IC 11A which carries out various processings, a timing generating circuit 11B which generates various timings, an analog processing circuit 11C, an image processing circuit unit 11E, a line memory circuit 11D, a data bus, and an address bus.

The timing generating circuit 11B generates various timings. The analog processing circuit 11C carries out processing to process the analog signal from the CCD line sensor 9 and convert the analog signal to a digital signal. The image processing circuit unit 11E carries out image corrections of the digital signal outputted from the analog processing circuit 11C, such as shading correction to correct the above high-frequency and low-frequency distortions, and time correction processing to correct a line position shift between plural line sensors. The line memory circuit 11D is a circuit to delay image data by line when the image processing circuit unit 11E carries out the time correction processing.

The processing IC 11A controls a CCD sensor control circuit 10A mounted on the CCD sensor board 10 and a light source control circuit 16 which carries out light emission control of the light source 1, and also controls a driving system control circuit 17 which controls a motor 18 for moving the first carriage 4 and the second carriage 7.

The CCD sensor board 10 has the CCD line sensor 9, the CCD sensor control circuit 10A, and a CCD driver 10B. The CCD driver 10B receives an output of the CCD sensor control circuit 10A and drives the four-line CCD sensor 9.

Figure 3:
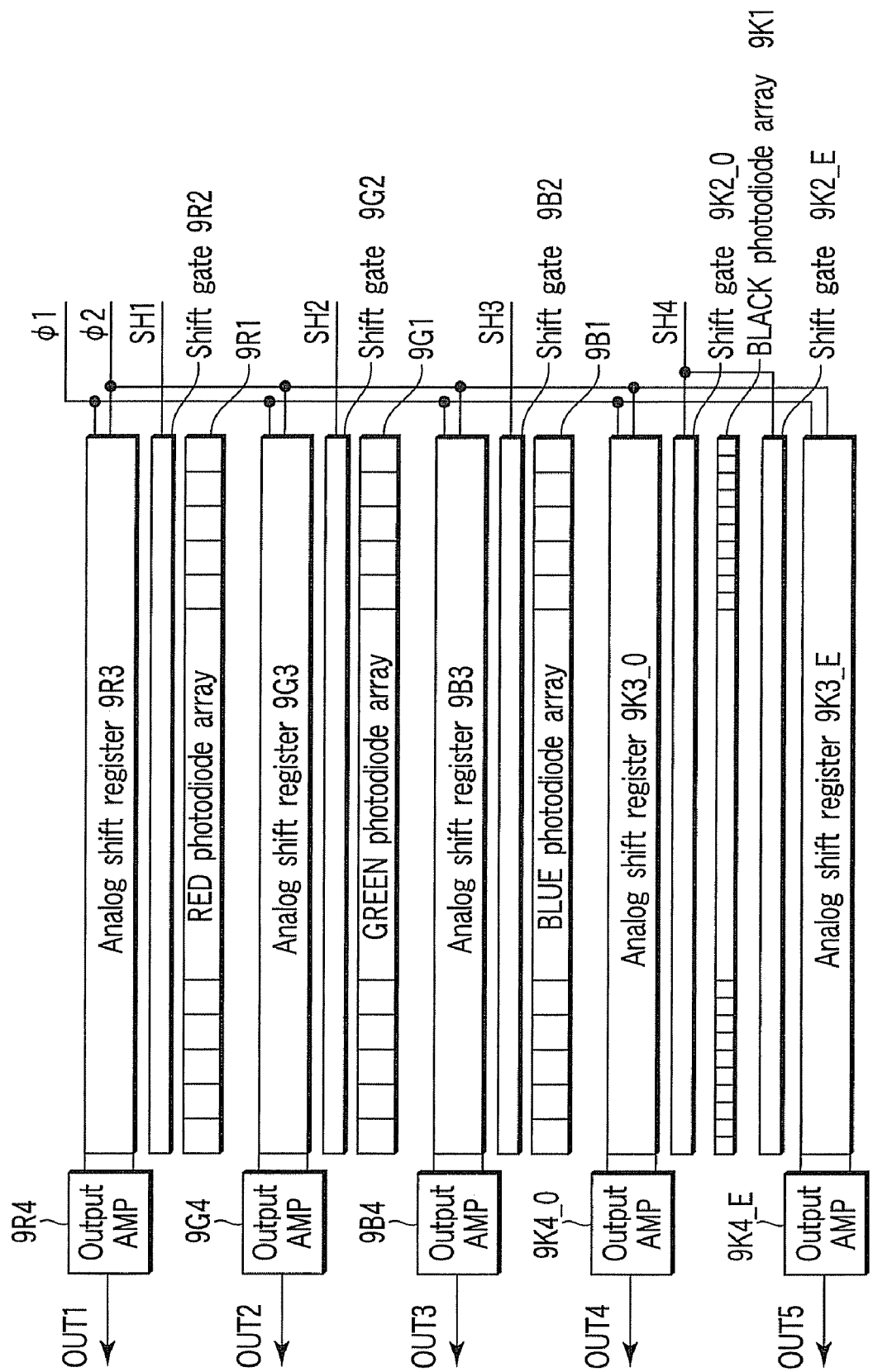
FIG. 3 is a view showing a schematic configuration of a four-line CCD sensor.

FIG. 3 shows a schematic configuration of the four-line CCD sensor 9. In photoelectric conversion by a RED photodiode array 9R1 having a red color filter arranged on its light receiving surface, not shown, incident light is converted to a quantity of charges corresponding to the quantity of light and the charges are accumulated in each photodiode. The accumulated charges pass through a shift gate 9R2 in accordance with a control signal SH1 applied to the shift gate 9R2 and are transferred to an analog shift register 9R3. The charges transferred to the analog shift register 9R3 sequentially move toward an output AMP 9R4 on the later stage in accordance with control signals $\phi 1$ and $\phi 2$ and outputted to outside from the output AMP 9R4. The output signal in this case is OUT1.

Similarly, in photoelectric conversion by a GREEN photodiode array 9G1 having a green color filter arranged on its light receiving surface, not shown, incident light is converted to a quantity of charges corresponding to the quantity of light and the charges are accumulated in each photodiode. The accumulated charges pass through a shift gate 9G2 in accordance with a control signal SH2 applied to the shift gate 9G2 and are transferred to an analog shift register 9G3. The charges transferred to the analog shift register 9G3 sequentially move toward an output AMP 9G4 on the later stage in accordance with control signals $\phi 1$ and $\phi 2$ and outputted to outside from the output AMP 9G4. The output signal in this case is OUT2.

Similarly, in photoelectric conversion by a BLUE photodiode array 9B1 having a blue color filter arranged on its light receiving surface, not shown, incident light is converted to a quantity of charges corresponding to the quantity of light and the charges are accumulated in each photodiode. The accumulated charges pass through a shift gate 9B2 in accordance with a control signal SH3 applied to the shift gate 9B2 and are transferred to an analog shift register 9B3. The charges transferred to the analog shift register 9B3 sequentially move toward an output AMP 9B4 on the later stage in accordance with control signals $\phi 1$ and $\phi 2$ and outputted to outside from the output AMP 9B4. The output signal in this case is OUT3.

Similarly, in photoelectric conversion by a BLACK photodiode array 9K1 having no color filter arranged on its light receiving surface, incident light is converted to a quantity of charges corresponding to the quantity of light and the charges are accumulated in each photodiode. The pixels of odd ordinal numbers of the accumulated charges pass through a shift gate 9K2_O in accordance with a control signal SH4 applied to the shift gate 9K2_O and are transferred to an analog shift register 9K3_O. The pixels of even ordinal numbers pass through a shift gate 9K2_E in accordance with a control signal SH4 applied to the shift gate 9K2_E and are transferred to an analog shift register 9K3_E.

The charges transferred to the analog shift register 9K3_O sequentially move toward an output AMP 9K4_O on the later stage in accordance with control signals $\phi 1$ and $\phi 2$ and outputted to outside from the output AMP 9K4_O. The charges transferred to the analog shift register 9K3_E sequentially move toward an output AMP 9K4_E on the later stage in accordance with control signals φ1 and φ2 and outputted to outside from the output AMP 9K4_E. The output signals in this case are OUT4 and OUT5, respectively.

Figure 4:
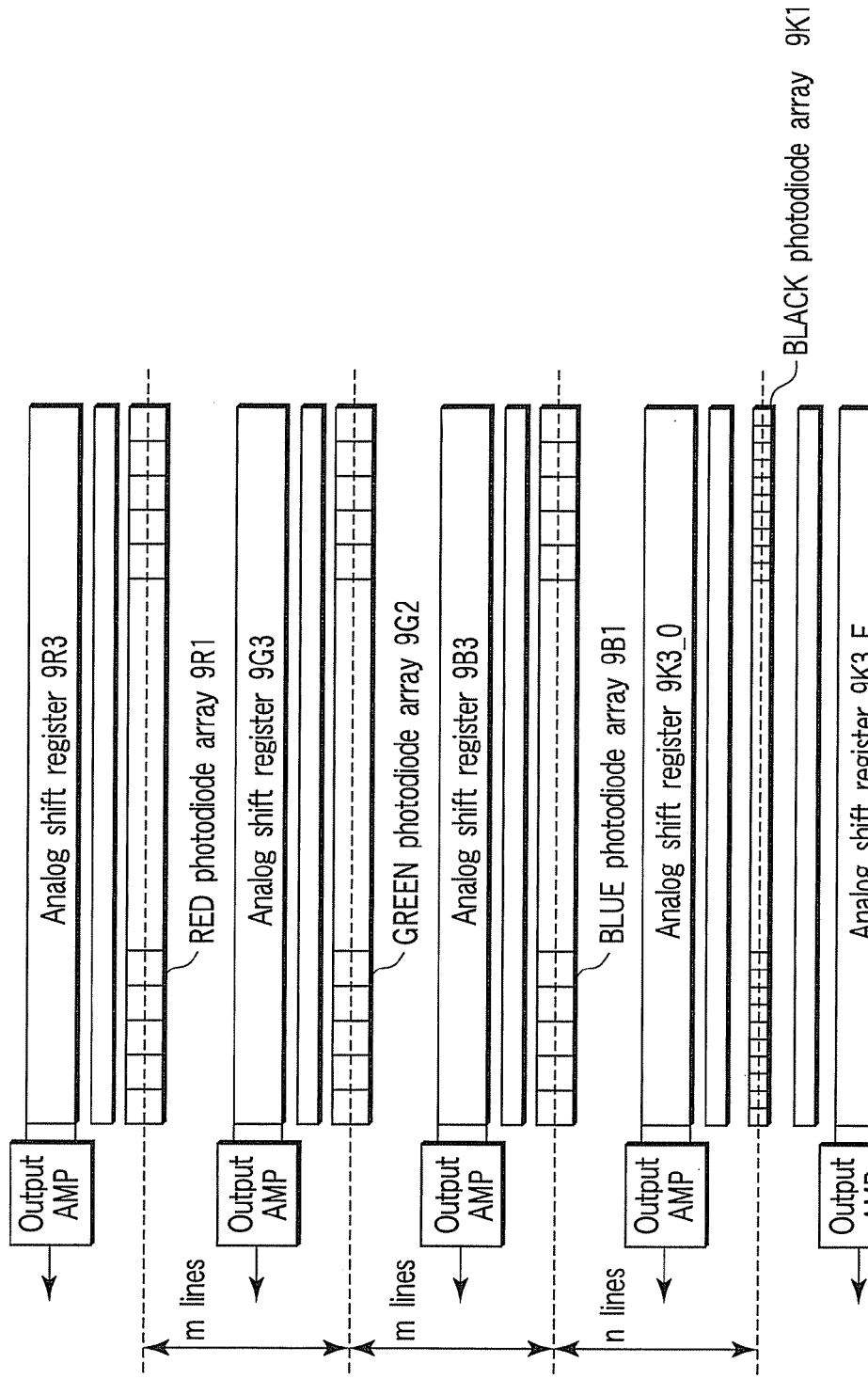
FIG. 4 is an explanatory view of the distance between lines of the four-line CCD sensor.

FIG. 4 shows the distance between the RED photodiode array 9R1, the GREEN photodiode array 9G1, the BLUE photodiode array 9B1, and the BLACK photodiode array 9K1.

The RED photodiode array 9R1 and the GREEN photodiode array 9G1 are arranged away from each other by a distance equal to the pixel size multiplied by m (the pixel size will be described in detail later). The GREEN photodiode array 9G1 and the BLUE photodiode array 9B1 are arranged away from each other by a distance equal to the pixel size multiplied by m.

The BLUE photodiode array 9B1 and the BLACK photodiode array 9K1 are arranged away from each other by a distance equal to the pixel size multiplied by n.

Now, the pixel size of the BLACK photodiode array 9K1 will be described. In the case where the longitudinal direction of A4 size, which is 297-mm long, is read with a resolution of 600 dpi, $$(600 \text{ dpi}/25.4 \text{ mm}) \times 297 \text{ mm} = 7015.7$$

holds and at least the number of pixels equal to 7016 or more is necessary. If an attachment error of the CCD line sensor 9 and a shift in the position where the original org is set are considered, the number of pixels equal to 7016+α is required. Therefore, here, the number of pixels of the BLACK photodiode array 9K1 is assumed to be 7500 pixels.

If this pixel size is to be accommodated in a 35-mm chip, the pixel pitch should be 4.7 μm (4.7 μm×7500 pixels=35.25 mm). This size differs depending on optical magnification of the reducing optical system. Therefore, if the pixel pitch is 7 μm, the chip size is 52.5 mm.

In this embodiment, description is made on the assumption that the pixel pitch of the BLACK photodiode array 9K1 is 4.7 μm.

The number of pixels of each of the RED photodiode array 9R1, the GREEN photodiode array 9G1 and the BLUE photodiode array 9B1 is 3750 pixels (which is half the number of pixels, 7500, of the BLACK photodiode array 9K1.)

Figure 5:
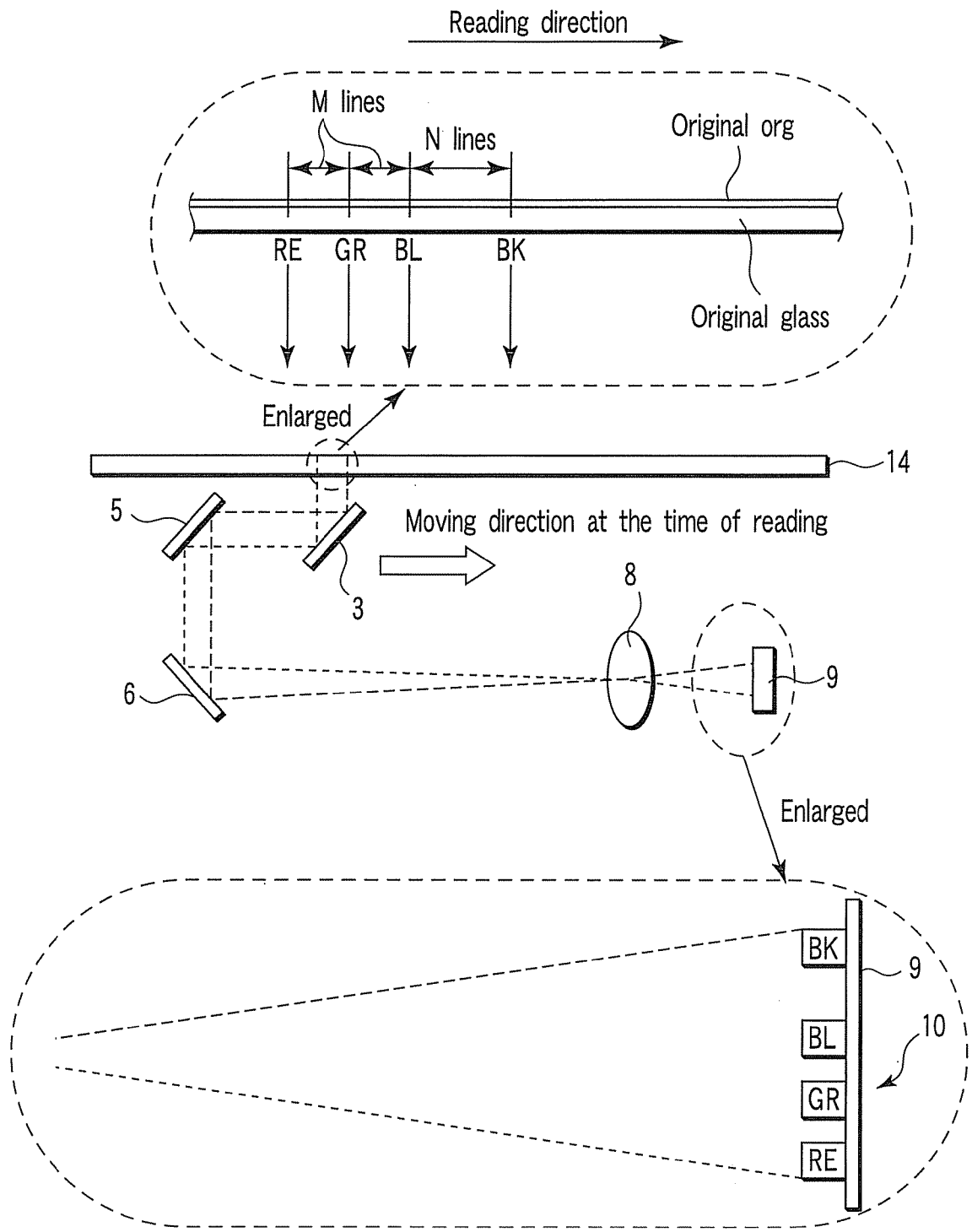
FIG. 5 is a view illustrating an image reading position on an original surface and the arrangement of each line sensor.

FIG. 5 shows an explanatory view of the four-line CCD sensor 9 and the position to read the original org.

The inside of the CCD line sensor 9 is formed by the four line sensors as shown in FIG. 3. The scanner is a reducing optical system using the condensing lens 8. Therefore, as shown in FIG. 5, the CCD line sensor 9 is arranged in such a way that the BLACK photodiode array 9K1 comes close to the original glass 14 from above in the explanatory view. With this arrangement, the image on the original surface is read by the black (BK), blue (BL), green (GR) and red (RE) line sensors in this order from the right. The spacing between the reading positions is decided by the arrangement of each photodiode array shown in FIG. 4 and the optical magnification.

The spacing between the RED photodiode array 9R1 and the GREEN photodiode array 9G1 of FIG. 4 is equal to the pixel size of the BLACK photodiode array 9K1 multiplied by m. Therefore, in order to read the original by the BLACK photodiode array 9K1 with a resolution of 600 dpi, adjustment is made so that the pixel size optically becomes 42.3 μm×42.3 μm on the original surface. Thus, M lines=m×42.3 μm and N lines=n×42.3 μm hold.

Figure 6:
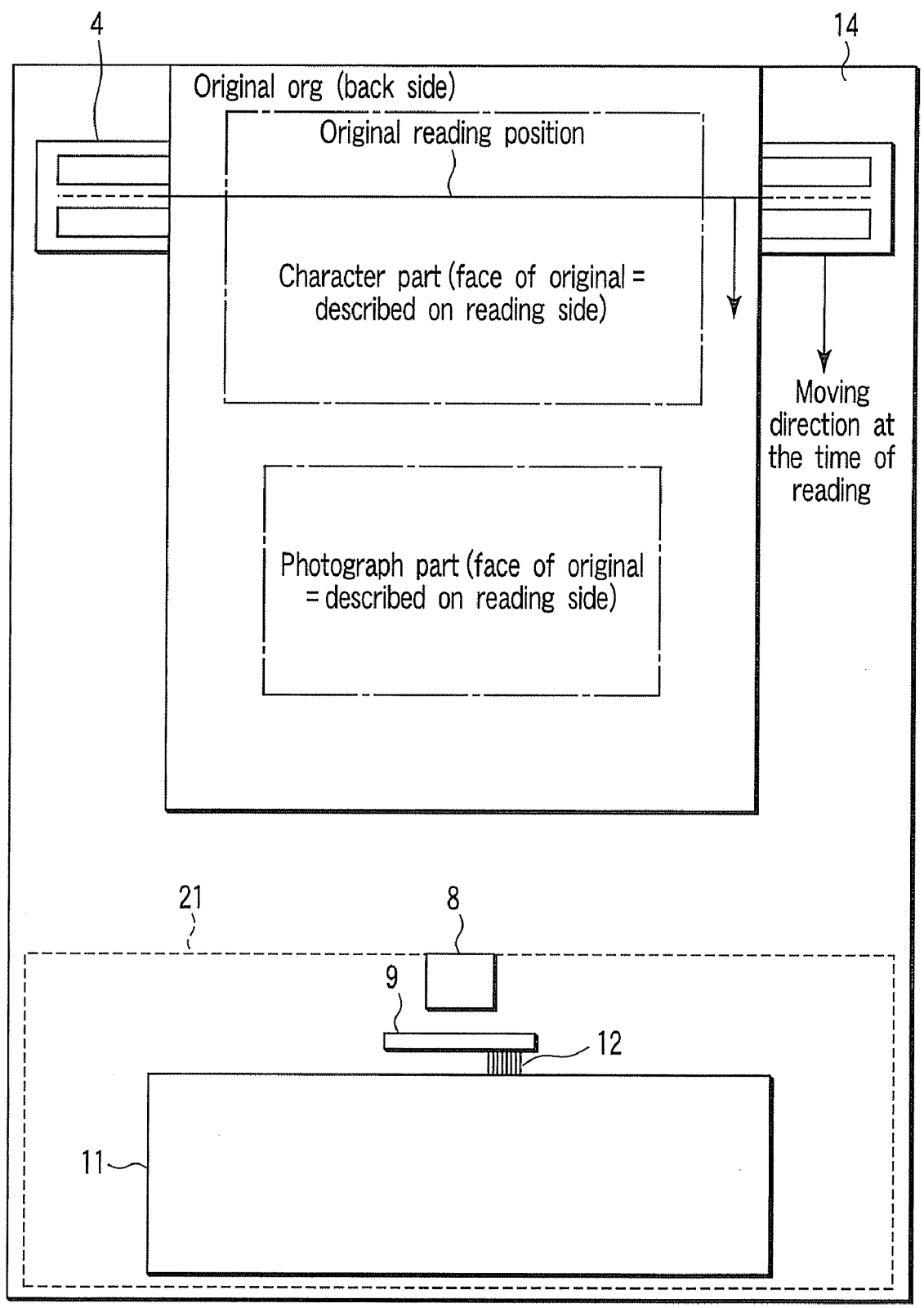
FIG. 6 is a view schematically illustrating the image reading apparatus as viewed from above.

FIG. 6 shows an explanatory view of the image reading apparatus shown in FIG. 1, as viewed from above. The original org set on the original glass 14 is scanned as the first carriage 4 is moved in the reading direction by a driving system, not shown, and the information on the original org is sequentially read. In this case, since the original org is set in the reversed position, the image information is described on the other side as shown in FIG. 6. The reflected light from the original org passes through the condensing lens 8 as described with reference to FIG. 1 and forms an image on the four-line CCD sensor 9. It is then converted to an electric signal, passes through the CCD board 10 and the harness 12, not shown, and is processed on the control board 11.

Meanwhile, the condensing lens 8, the four-line CCD sensor 9, the CCD board 10, the control board 11, and the harness 12 are sealed by a dustproof cover member 21 in order to prevent attachment of foreign matter such as dust to these parts.

In the above-described apparatus, the BLACK photodiode array 9K1 having the larger number of pixels in the four-line CCD sensor 9 can read the original earlier than any other line sensor. Therefore, the spatial frequency of the information described in the original org is detected from the result of this reading, and it is detected whether the described information is line drawing information such as a character or information with continuous density change such as a photograph. Thus, the processing on the later stage can be switched accordingly.

Figure 7:
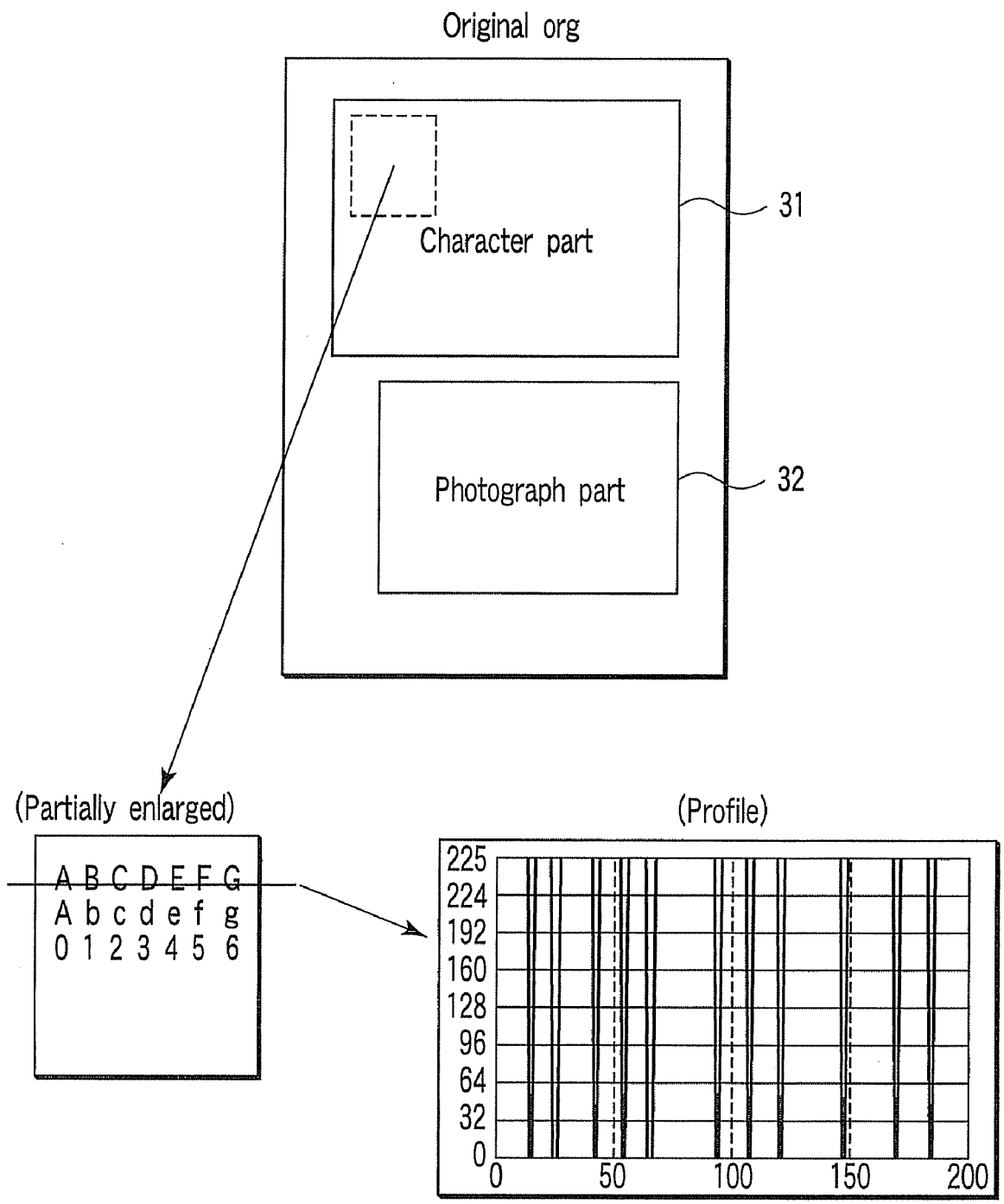
FIG. 7 is a view illustrating an image data profile in a case where a character part of an original is read.

A specific example will now be shown and described with reference to FIG. 7. As a result of reading with the configuration of FIG. 6, the profile of the image signal in the character part in the upper part of the original is as shown in FIG. 7. The horizontal axis of the profile represents the position information of the original and the vertical axis represents luminance information. In this case, 0 indicates black (dark) and 255 indicates white (light) on the vertical axis. The horizontal axis shows positions from left to right in the character part 31 of the original org.

As is clear from FIG. 7, in the case of a line drawing such as a character, since reflectance suddenly changes between the background and the line drawing information, the profile has a high frequency with a steep slope at change points of the image signal, as shown in FIG. 7. If the background is not white, it has a value smaller than 255 on the vertical axis of the profile. If the line drawing part is not black, the line drawing part has a value larger than 0. However, since the change points in the profile, which are boundaries between the background and the line drawing part, have a steep slope, it can be determined that the image includes a line drawing such as a character. When this determination is made, edge highlighting processing to highlight the change points in the image, range correction to expand the density difference between the background and the character part, and so on is carried out in order to make the line drawing part more visible.

Figure 8:
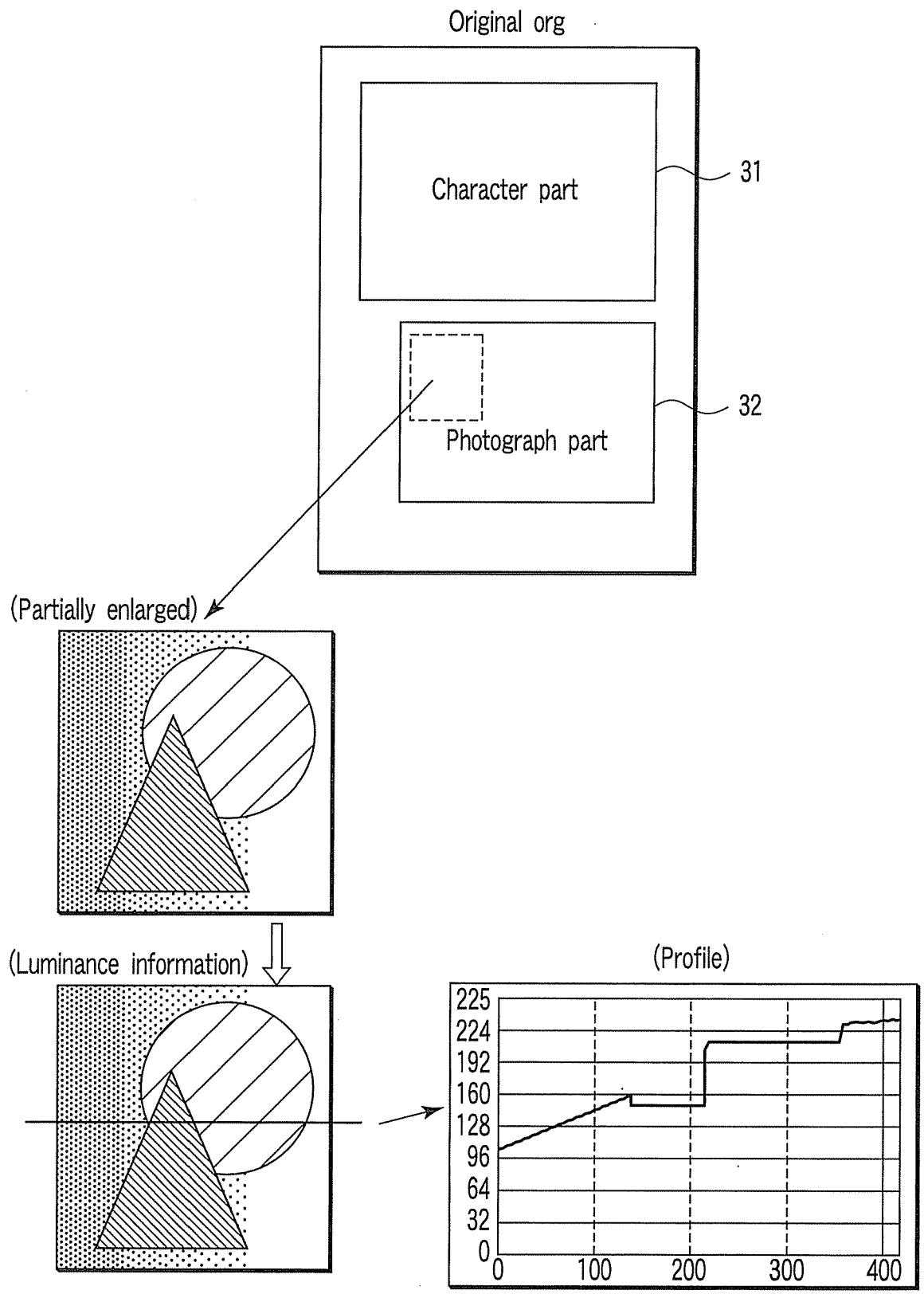
FIG. 8 is a view illustrating an image data profile in a case where a photograph part of an original is read.

An example in which a read image contains half tone instead of a line drawing will now be described with reference to FIG. 8. When enlarged, image data of the photograph part 32 in the lower part of the original can look as shown in FIG. 8 (partially enlarged). Practically, since the image is read by the BLACK photodiode array 9K1 having no filter provided on its light receiving surface to shut off a specific wavelength, luminance information is an electrical signal proportional to the quantity of reflected light having wavelength of approximately 400 nm to around 800 nm. In the profile, the vertical axis represents the luminance information. On the vertical axis, 0 indicates black (dark) and 255 indicates white (light). The horizontal axis represents positions from left to right in the character part 31 of the original org.

In this profile of luminance information, the changes points do not have a steep slope such as in FIG. 7, but exhibit a shape that continuously and moderately changes or has a small quantity of change. From such characteristics, it can be determined that the read image information is not of a line drawing but of a photograph part having half tone or having continuous density change. When this determination is made, averaging processing, or low-pass filter processing to eliminate high-frequency components or the like is carried out in order to reduce a pseudo-contour due to the insufficient number of gradation levels and an unnatural line drawing due to excessive highlighting of the edge.

These kinds of processing are carried out to the output read by the BLACK photodiode array 9K1 prior to the other photodiode arrays, and it can be reflected on the outputs of the other RED, GREEN and BLUE photodiodes.

The processing operation will now be described with reference to FIG. 9. The read image signal (image signal "in") is a signal including K, which is monochrome information, and RGB signals, which are color signals. The signals mentioned here are the signals after the execution of normalization based on shading correction processing, and correction between RGB lines. Also, as the monochrome signal of the output from the four-line CCD sensor 9 has a resolution of 600 dpi and the color signals have a resolution of 300 dpi, the result of performing resolution conversion of the reading resolution of the color signals from 300 dpi to 600 dpi by using the monochrome signal may be used. In this description, it is assumed that the color signals have a resolution of 600 dpi as a result of performing resolution conversion.

The image signal "in" is inputted to a processing characteristic control unit 46 and an image signal processing unit 47. In the processing characteristic control unit 46, the monochrome signal K of the image signal "in" is inputted to a spatial frequency determining unit 41, where the spatial frequency having the image information as described with reference to FIG. 7 and FIG. 8 is detected and its determination signal JUD is outputted. The determination signal JUD is inputted to a character area calculating unit 42. Using the determination signal JUD, this character area calculating unit 42 calculates which part of the read image is a character area, and which part of the read image is a non-character area including a photograph or the like. The result of this calculation is used by the image processing unit 47 as a control signal to control the processing characteristics of at least the image signal read by the first line sensor.

The area calculating unit 42 may also convert the image area into coordinates. For example, for an A4-size original, when the original is set on the original glass 14 as shown in FIG. 6, the original coordinate in the main scanning direction is 1250 to 6250 (equivalent to 210 mm width of A4=5000 pixels) and the original coordinate in the sub scanning direction is 0 to 7020 (equivalent to 297 mm length of A4=7020 pixels). If the main scanning direction is defined as X and the sub scanning direction is defined as Y, the coordinates of the vertices of each area can be calculated as follows: the character area (X,Y)=(1500, 100), (6000, 100), (1500, 3000), and (6000, 3000); and the non-character area (X,Y)=(1700, 3100), (5000, 3100), (1700, 6000), and (5000, 6000).

In this apparatus, the difference in the reading position between the BLACK photodiode array 9K1 and the BLUE photodiode array 9B1 is N lines. Therefore, if the determination range in the sub scanning direction is set to N at the maximum, the characteristics of the area can be determined in real time.

If it is determined that the area is a character area, a CHA signal is inputted to a character part processing unit 43 which carries out edge highlighting processing and range correction processing, and it processes the color signals RGB. If it is determined that the area is non-character, a PIC signal is inputted to a non-character part processing unit 44 which carries out averaging processing and low-pass filter processing, and it processes the color signals RGB. The color image signals RGB from the character part processing unit 43 and the non-character part processing unit 44 are combined by a combining unit 45 on the later stage.

Meanwhile, for an area such as background, which has no density change and generates a uniform luminance signal, the signal is outputted via either the character part processing unit 43 or the non-character part processing unit 44 (since there is no density change, the signal does not change no matter which processing unit is employed.)

The above-described character part, non-character part and background part are combined by the combining unit on the later stage, and the combined signals are outputted as image information to be processed on the later stage.

Moreover, information showing the processing state in the processing characteristic control unit 46 may be inputted to a system control unit 13. Using the information showing the processing state, the system control unit 13 may presents a display showing that the character area is being processed, or that the image area is being processed, or the like, in a display section 27a of a control panel 27. For example, the present setting state may be such that the second line sensor is to read the original image earlier than the other line sensors and a mode of controlling the processing characteristic based on its result is to be shown.

The memory capacity that is necessary for time adjustment between lines in the case where an image is read in the above-described reading direction will now be described with reference to FIG. 10A, FIG. 10B and FIG. 10C. For convenience in the explanation, it is assumed that the spacing in the photodiode array is set to m=4 and n=6.

As is clear from FIG. 10A and FIG. 10B, in the case where reading by the BLACK photodiode array 9K1 is carried out earlier, a memory capacity of 160 Kbytes is necessary to align all of red information, green information, blue information and black information. As a comparison, when color signals are handled with 300 dpi, the alignment with black information is not necessary and therefore a memory capacity of 48 Kbytes (see FIG. 10C) suffices. However, when a color image is handled for copying, the resolution of 300 dpi is insufficient and it may lead to deterioration in image quality.

Figure 11A:
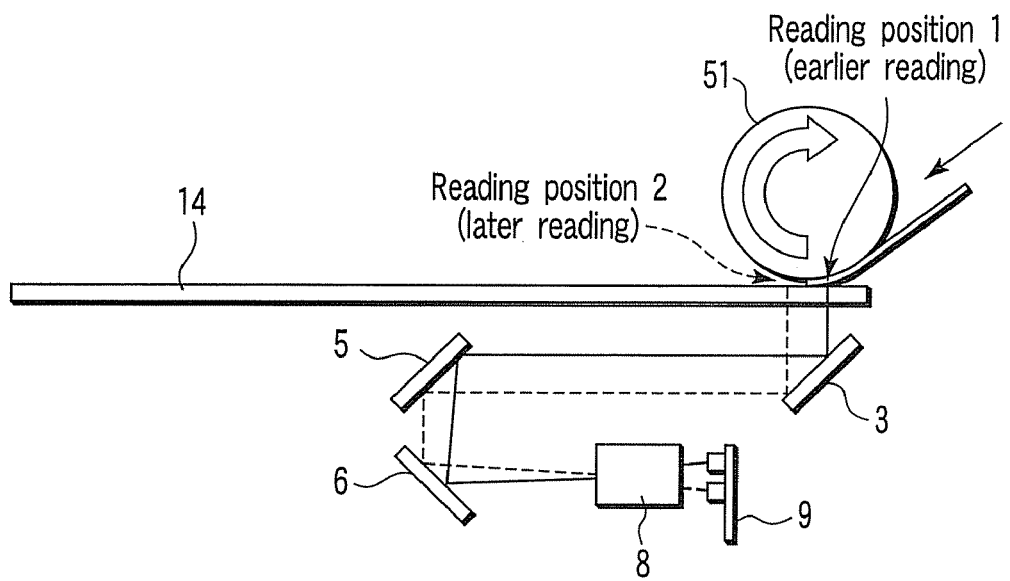
FIG. 11A is an explanatory view of an original carrier mechanism.
Figure 11B:
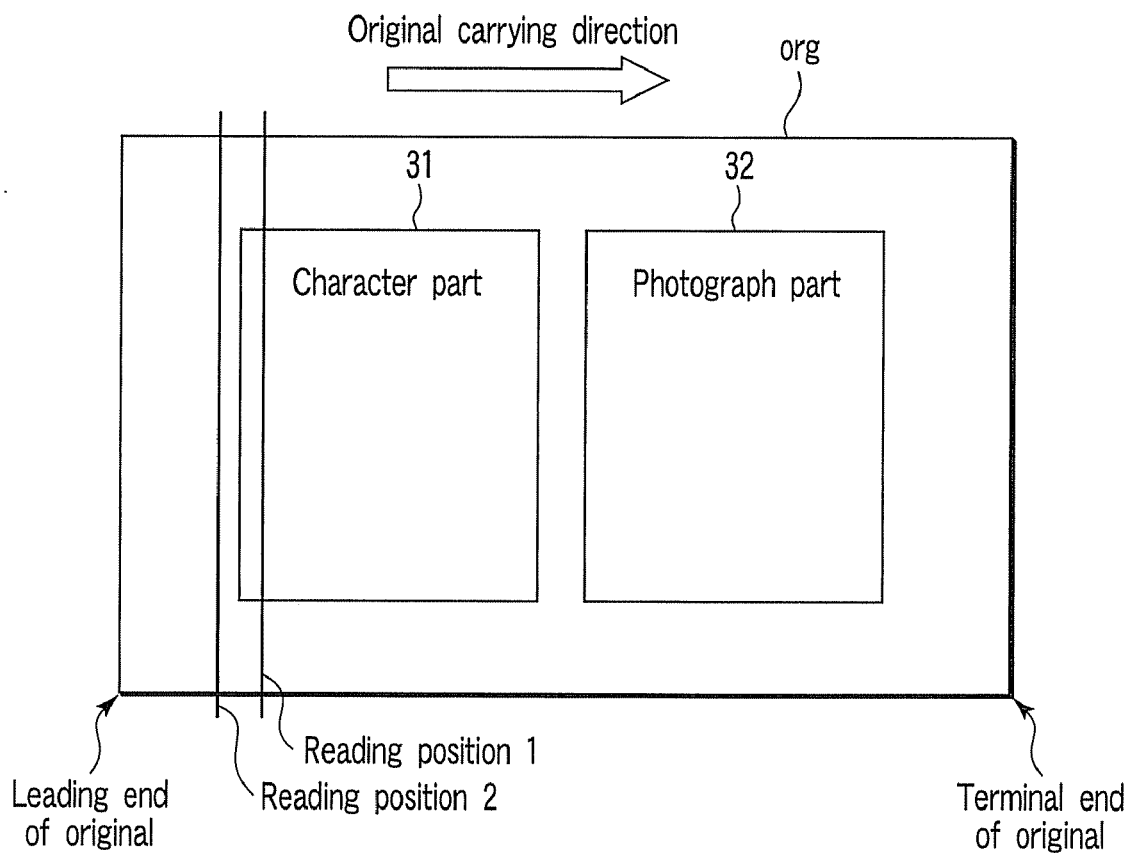
FIG. 11B is an explanatory view showing an original carrying direction by the original carrier mechanism.

FIG. 11A shows an explanatory view of an original carrier mechanism. FIG. 11B describes the original reading direction. In the previous embodiment, the image of the original org is read as the first carriage 4 moves. However, a scanner having a system in which the original image is read as the original org moves, may also be employed. As shown in FIG. 11A, the original org is carried between a rotary roller 51 and, for example, an original glass 52. At this time, the original image of the original org passes through the mirrors 3, 5 and 6 and the condensing lens 8 and is guided to the four-line CCD sensor 9.

In this case, since the BLACK photodiode array 9K1 reads the original earlier, the similar processing to the previous embodiment can be carried out.

Figure 12:
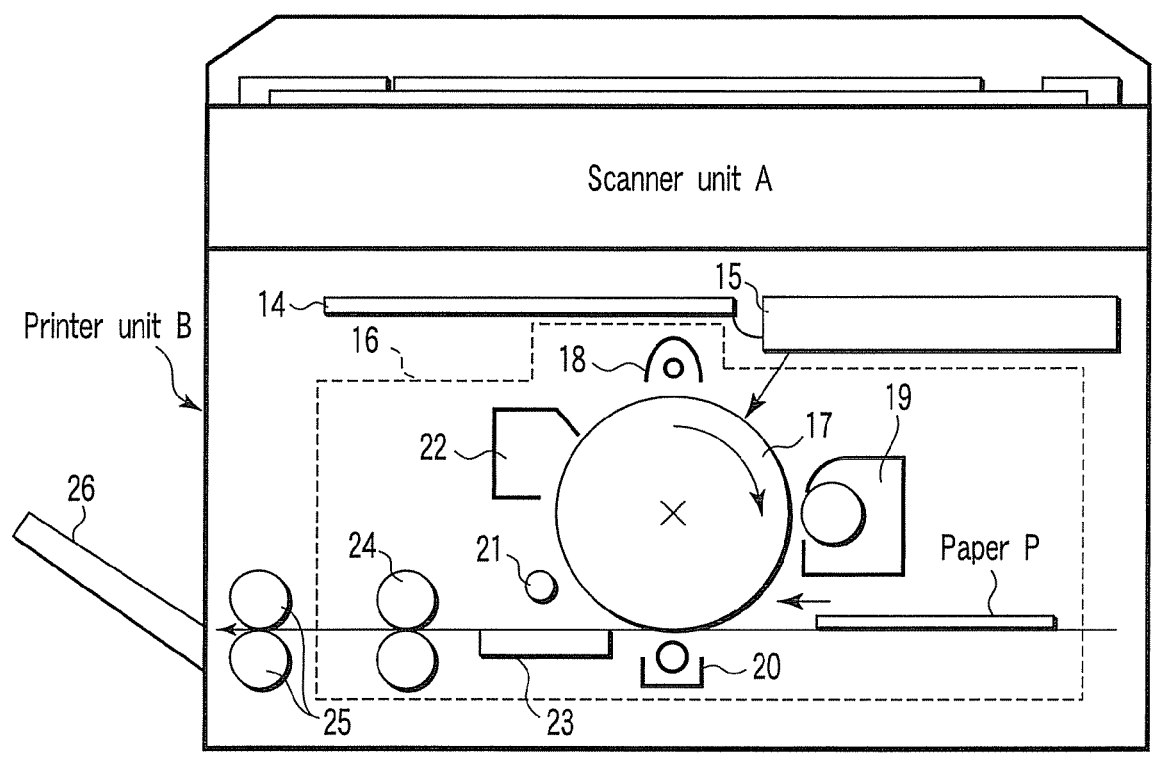
FIG. 12 is a view showing an exemplary schematic configuration of a mechanical unit of an image forming apparatus.

FIG. 12 shows a schematic view of a digital copy machine using the image reading apparatus shown in FIG. 1. The digital copy machine includes a scanner unit A, which is the image reading apparatus described with reference to FIG. 1, and a printer unit B which forms an image on paper.

A normalized image signal outputted from the image processing circuit unit 11E shown in FIG. 1, in the scanner unit A, is inputted to an image processing unit 14. In this unit, the image signal is stored in a temporary recording section such as a page memory, not shown, and enlarging and reducing processing is carried out. Also, the image signal including blue, green and red components is converted to a signal having the four colors of yellow, magenta, cyan and black, which is a suitable form for image forming. The image signal that has been converted to these four color components is converted to a control signal for a semiconductor laser in a laser optical system 15 on the later stage and is inputted to the laser optical system 15.

An image forming unit 16 has a photoconductive drum 17, a charger 18, a developing unit 19, a transfer charger 20, a separation charger 21, a cleaner 22, a paper carrier mechanism 23, a fixing unit 24, a paper discharge roller 25 and so on. The paper P is carried by the paper carrier mechanism 23, then processed in each process, and discharged to a paper discharge tray 26. The configuration and system of this image forming unit 16 are of a typical electrophotographic system and therefore will not be described further in detail.

Also, as the transfer efficiency to the paper P has recently been improved, a configuration without having the cleaner 22 may be employed.

Figure 13:
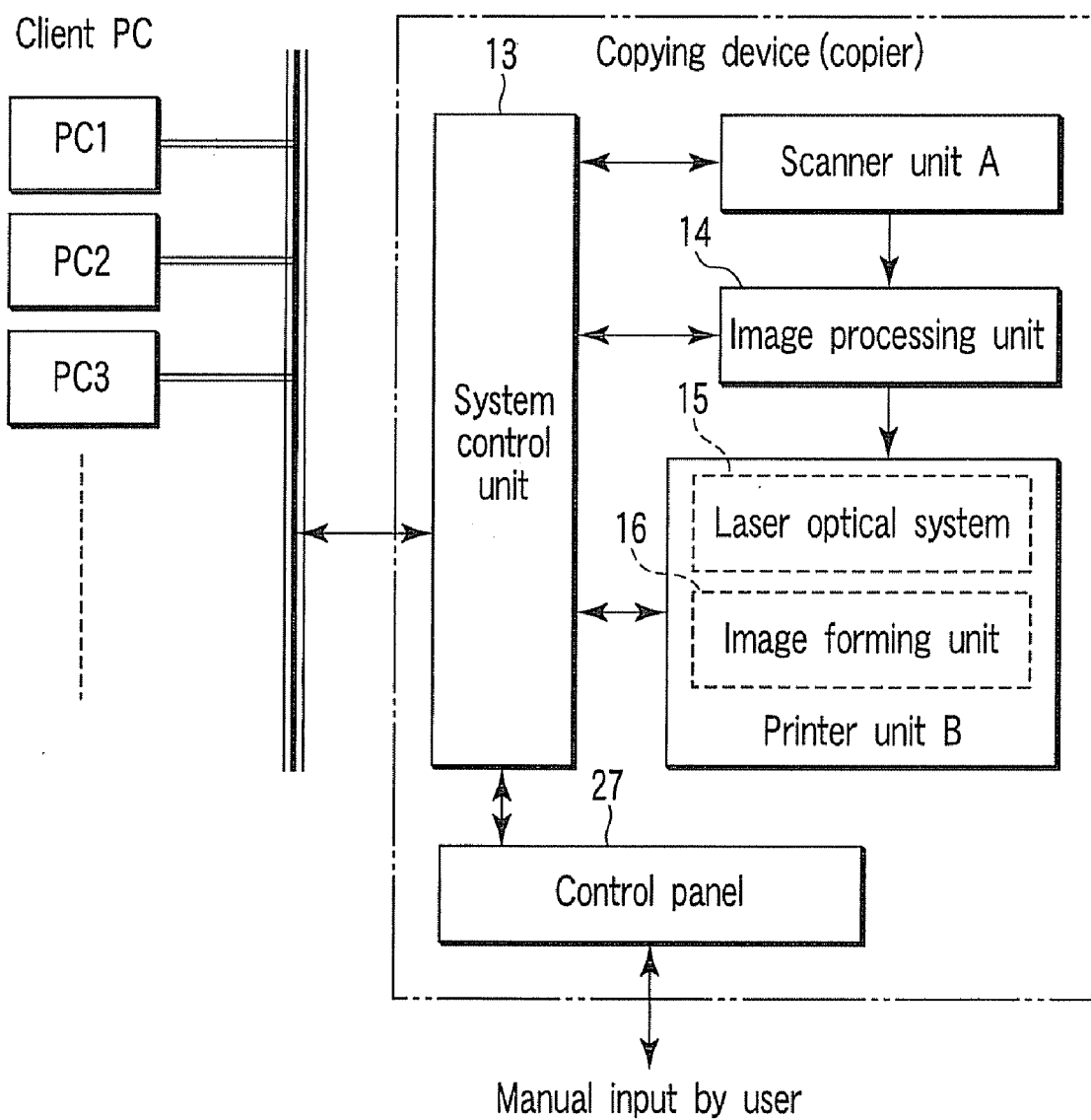
FIG. 13 is a view showing an exemplary schematic configuration of a functional block of the image forming apparatus.

FIG. 13 shows a schematic configuration of a digital copy machine as viewed in terms of electric configuration. The system control unit 13 is a unit which performs overall control of this system. It controls the scanner unit A, the image processing unit 14 and the printer unit B, and also has an interface (I/F) to send and receive data to and from outside via a network.

An image signal outputted from the scanner unit A is inputted to the image processing unit 14. The image processing unit 14 carries out various processings, and the signal is inputted to the printer unit B. When the original org is read for the purpose of copying, processing is carried out in the above flow. When the original org is read for the purpose of filing, a compressed version of the image signal outputted from the scanner unit A is transferred to an external client PC via a network, through the system control unit 13.

This determination as to whether it is copy processing or filing processing, is set by the user's input on the control panel 27.

Figure 9:
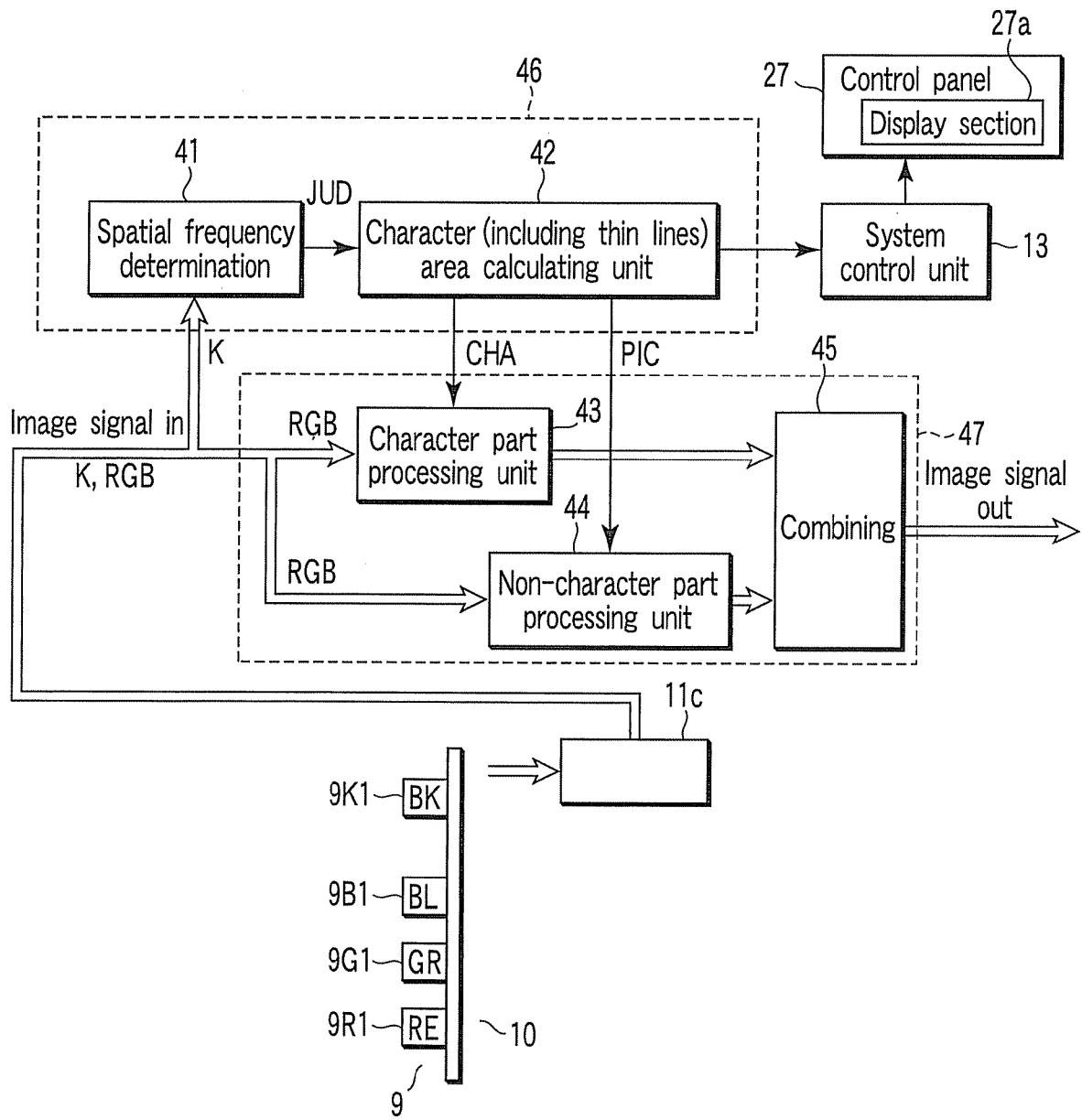
FIG. 9 is a view showing an exemplary configuration of an image processing unit which performs area processing of a character part and a non-character part.

In the case of using the image reading apparatus of FIG. 1 as a monochromatic image forming apparatus, at the time copying, a color signal can be converted to a monochrome signal after the processing described with reference to FIG. 9 is carried out. Meanwhile, in the case of using the image reading apparatus of FIG. 1 as a color scanner connected to a network, a signal can be converted to a desired file format, for example, JPEG, TIFF or PDF by the system control unit after the processing of FIG. 9, and a color image file can be transferred to an external client PC via the network.

In this description, the configuration for monochromatic copying as shown in FIG. 11 is described for the image forming apparatus. However, as a matter of course, the developing unit 19 may be used for color (multiple-color) copying with the four colors of yellow, magenta, cyan and black. This invention is basically applicable to any apparatus that has a first line sensor and a second line sensor having a higher resolution than the first line sensor and reading an original image earlier than the first line sensor. Although the distance between lines is explained as m lines and n lines in the above description, the distance between lines may be the same.

As the above apparatus is used, whether the information described on an original is a line drawing or a half-tone image can be detected in advance. Therefore, processing suitable for the image information can be easily carried out.

This invention is not limited to the above embodiments, and practically its components can be embodied in modified manners without departing from the scope of the invention. Also, various inventions can be made by suitably combining plural components disclosed in the above embodiments. For example, some of the components disclosed in the embodiments can be deleted. Moreover, components used in different embodiments can be suitably combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus comprising:
a second line sensor which has a larger number of pixels than a first line sensor and reads an original image earlier than the first line sensor; and
a processing characteristic control unit configured to use an output of the second line sensor as a control signal to control a processing characteristic of an image signal read by the first line sensor,
wherein the first line sensor is a three-line sensor which transmits each of wavelength ranges of red, green and blue, and the second line sensor is a monochromic single-line sensor that has a greater number of pixels than each line sensor of the three-line sensor.

2. The image reading apparatus according to claim 1, wherein the processing characteristic control unit includes:
a spatial frequency determining unit configured to detect a spatial frequency of information from the output of the second line sensor; and
an area calculating unit configured to output different control signals in areas where the detected spatial frequency differs.

3. The image reading apparatus according to claim 1, wherein the first line sensor has, on its light receiving surface, a filter to limit wavelength of incident light.

4. The image reading apparatus according to claim 1, wherein an output of the first line sensor is inputted to an image signal processing unit having a character processing unit and a non-character processing unit which are controlled by the control signal.

5. An image forming apparatus comprising:
a first line sensor;
a second line sensor which has a larger number of pixels than the first line sensor and reads an original image earlier than the first line sensor;
a processing characteristic control unit configured to use an output of the second line sensor as a control signal to control a processing characteristic of an image signal read by the first line sensor;
an image signal processing unit to which an output of the first line sensor is inputted; and
a printer unit to which an output of the image processing unit is supplied,
wherein the first line sensor is a three-line sensor which transmits each of wavelength ranges of red, green and blue, and the second line sensor is a monochromic single-line sensor that has a greater number of pixels than each line sensor of the three-line sensor.

6. The image forming apparatus according to claim 5, and wherein the processing characteristic control unit has a spatial frequency determining unit configured to detect a spatial frequency of information from the output of the second line sensor and an area calculating unit configured to output different control signals in areas where the detected spatial frequency differs, and wherein the image signal processing unit has a character processing unit and a non-character processing unit which are controlled by the control signal.

7. A control method for an image reading apparatus having a first line sensor which reads an original image, a second line sensor which has a larger number of pixels than the first line sensor and reads the original image earlier than the first line sensor, an image signal processing unit configured to process an output of the first line sensor, and a processing characteristic control unit configured to process an output of the second line sensor, the first line sensor being a three-line sensor which transmits each of wavelength ranges of red, green and blue, and the second line sensor being a monochromic single-line sensor, wherein the monochromic line sensor has a greater number of pixels than each line sensor of the three-line sensor, the method comprising:
   determining a spatial frequency of the output of the second line sensor by the processing characteristic control unit;
   obtaining different control signals identifying a character area and a non-character area of the original image in accordance with a result of determination of the spatial frequency by an area calculating unit; and
   controlling a characteristic of the image signal processing unit by the control signal.

8. The control method for the image reading apparatus according to claim 7, wherein the image signal processing unit controls a character processing unit and a non-character processing unit by the control signal.

9. The control method for the image reading apparatus according to claim 7, wherein an output of the image signal processing unit is supplied to a printer unit of an image forming apparatus.

10. An image reading apparatus comprising:
   first reading means for reading an original image by a first line sensor;
   second reading means having a second line sensor which has a larger number of pixels than the first line sensor and reads the original image earlier than the first line sensor; and
   processing characteristic control means for using an output of the second line sensor as a control signal to control a processing characteristic of an image signal read by the first line sensor,
   wherein the first line sensor is a three-line sensor which transmits each of wavelength ranges of red, green and blue, and the second line sensor is a monochromic single-line sensor, and wherein the monochromic line sensor has a greater number of pixels than each line sensor of the three-line sensor.

11. The image reading apparatus according to claim 10, wherein the processing characteristic control means has:
   spatial frequency determining means for detecting a spatial frequency of information from the output of the second line sensor; and
   area calculating means for outputting different control signals in areas where the detected spatial frequency differs.

12. The image reading apparatus according to claim 10, wherein the first line sensor has, on its light receiving surface, a filter to limit wavelength of incident light.

13. The image reading apparatus according to claim 10, wherein an output of the first line sensor is inputted to image signal processing means having a character processing unit and a non-character processing unit which are controlled by the control signal.

* * * * *